US 6,583,573 B2

(12) United States Patent
Bierman

(10) Patent No.: US 6,583,573 B2
(45) Date of Patent: Jun. 24, 2003

(54) PHOTOSENSOR AND CONTROL SYSTEM FOR DIMMING LIGHTING FIXTURES TO REDUCE POWER CONSUMPTION

(75) Inventor: Andrew Bierman, Albany, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 10/007,741

(22) Filed: Nov. 13, 2001

(65) Prior Publication Data

US 2003/0090210 A1 May 15, 2003

(51) Int. Cl.$^7$ ............................................... H05B 37/02

(52) U.S. Cl. ...................... 315/149; 315/156; 315/159; 250/214 AL

(58) Field of Search .................................. 315/149, 150, 315/156, 158, 159, 294; 250/214 AL

(56) References Cited

U.S. PATENT DOCUMENTS

| | | | |
|---|---|---|---|
| 4,233,545 A | * 11/1980 | Webster et al. | 250/214 AL |
| 4,236,101 A | 11/1980 | Luchaco | 315/158 |
| 4,538,218 A | 8/1985 | Watson | 362/802 |
| 4,701,669 A | 10/1987 | Head et al. | 315/155 |
| 5,039,853 A | 8/1991 | Blake et al. | 250/239 |
| 5,357,170 A | 10/1994 | Luchaco et al. | 315/159 |
| 5,406,173 A | 4/1995 | Mix et al. | 315/156 |
| 5,663,621 A | 9/1997 | Popat | 318/480 |
| 5,699,243 A | 12/1997 | Eckel et al. | 364/140 |
| 5,701,058 A | 12/1997 | Roth | 315/158 |
| 5,721,471 A | 2/1998 | Begemann et al. | 315/158 |
| 5,812,422 A | 9/1998 | Lyons | 364/512 |
| 5,818,734 A | 10/1998 | Albright | 364/550 |
| 5,861,717 A | 1/1999 | Begemann et al. | 315/158 |
| 5,962,989 A | 10/1999 | Baker | 315/294 |
| 5,977,717 A | * 11/1999 | Dean | 315/156 |
| 6,025,679 A | 2/2000 | Harper et al. | 315/312 |
| 6,078,253 A | 6/2000 | Fowler | 340/501 |
| 6,084,231 A | 7/2000 | Popat | 250/214 AL |
| 6,122,678 A | 9/2000 | Eckel et al. | 710/15 |
| 6,151,529 A | 11/2000 | Batko | 700/28 |
| 6,188,182 B1 | 2/2001 | Nickols et al. | 315/294 |
| 6,225,760 B1 | * 5/2001 | Moan | 315/360 |

OTHER PUBLICATIONS

F. Rubenstein et al., "Improving the Performance of Photo Electrically Controlled Lighting Systems," Journal of the Illuminating Engineering Society, 1989, pp. 70–94.

A. Choi et al., "Development of A Daylight Responsive Dimming System and Preliminary Evaluation of System Performance," Building and Environment 35, 2000, pp. 663–676.

A. Bierman et al., "Characterizing Daylight Photosensor System Performance To Help Overcome Market Barriers," Journal of the Illuminating Engineering Society, 2000, pp. 101–115.

(List continued on next page.)

Primary Examiner—Hoang Nguyen
(74) Attorney, Agent, or Firm—RatnerPrestia

(57) ABSTRACT

A lighting control system provides a desired illumination level at a task location while saving power. Controlled electric light is produced having an intensity responsive to a control signal. The system comprises at least one light fixture and a photosensor that is configured to provide the control signal to the light fixture. The control signal is responsive to an illumination level at a sensor location and ratios of illumination levels at the sensor location to task location for uncontrolled (e.g., solar) light and controlled electric light. The photosensor has the ability to self-commission. In one embodiment, the photosensor includes a self-powered photocell unit that transmits a wireless sensor signal responsive to the illumination level at the photocell unit. This photocell unit can be moved for use at different locations during photosensor commissioning.

24 Claims, 10 Drawing Sheets

OTHER PUBLICATIONS

A. Choi et al., "On The Prediction Of Energy Savings For A Daylight Dimming System," Journal of the Illuminating Engineering Society, 1997, pp. 77–90.

F. Rubinstein, "Photoelectric Control Of Equi–illumination Lighting Systems," Energy & Buildings, pp. 141–150.

R. Mistrick, "Analysis Of Daylight Photocell Placement And View In A Small Office," Journal of the Illuminating Engineering Society, 1997, pp. 150–160.

National Lighting Product Information Program, "Specifier Reports: Photosensors, vol. 6, No. 1" Lighting Research Center, Rensselaer Polytechnic Institute (1998).

R. Mistrick et al., "A Comparison Of Photosensor–Controlled Electronic Dimming Systems In A Small Office," Journal of the Illuminating Engineering Society, 2000, pp. 66–80.

International Search Report dated Mar. 11, 2003.

* cited by examiner

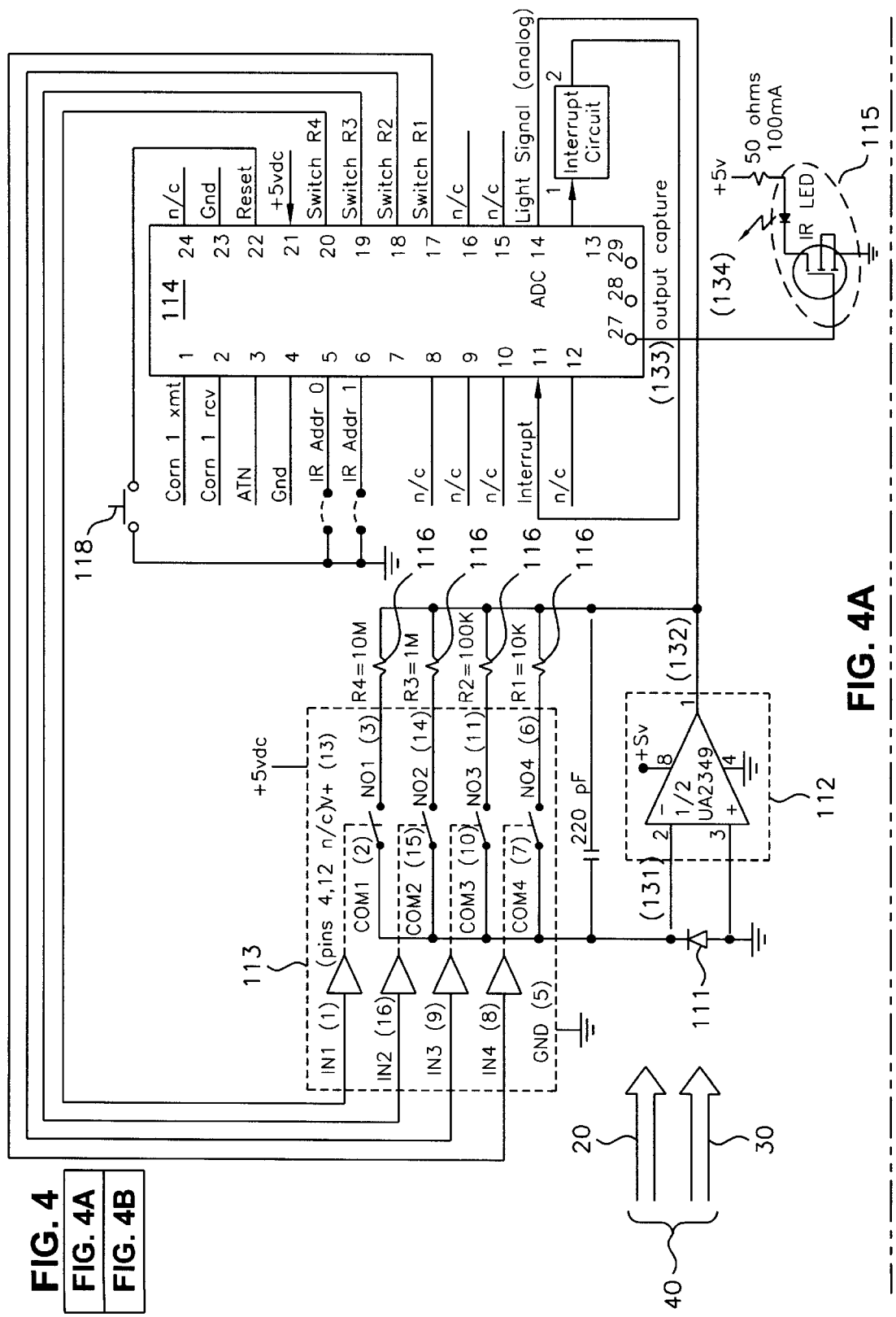

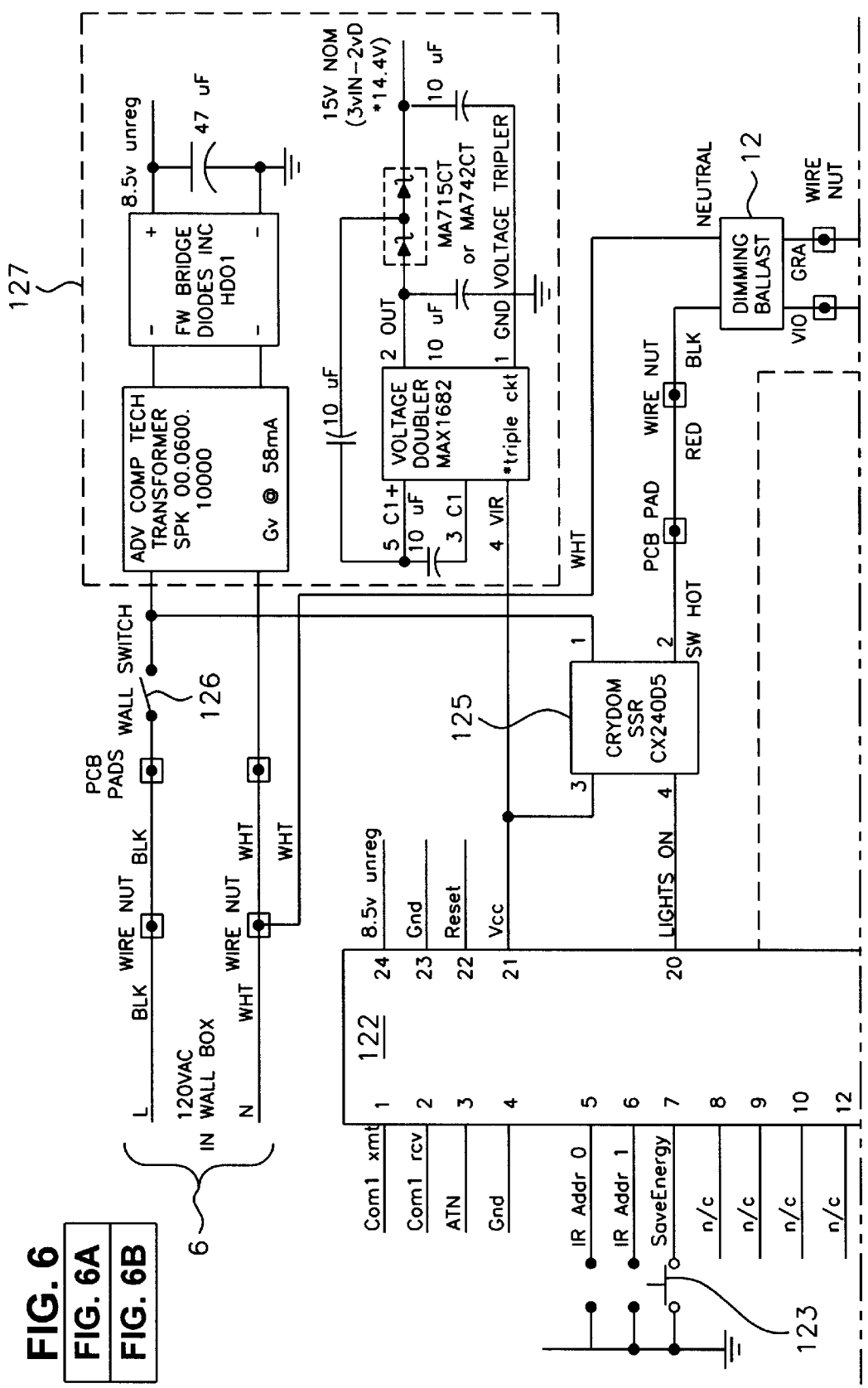

PHOTOSENSOR AND CONTROL SYSTEM FOR DIMMING LIGHTING FIXTURES TO REDUCE POWER CONSUMPTION

RIGHTS IN THE INVENTION

The Connecticut Light & Power Company has rights in this invention pursuant to Purchase Order No. 02158144.

BACKGROUND

1. Field of the Invention

The present invention relates generally to lighting control systems and, more particularly, to a photosensor and control system for switching or dimming lighting fixtures to reduce power consumption.

2. Description of the Related Art

Electric-powered lighting in commercial buildings in the United States accounts for 23% of the electricity consumed. Although the efficacy of the fluorescent lamp, the dominant electric-powered lighting source in the commercial sector, is unlikely to increase significantly during the next decade, there are significant opportunities to reduce energy consumption used for lighting in commercial applications. These opportunities are created by using daylight (or solar light) more effectively by controlling the amount of electric-powered light delivered in response to available daylight. Studies undertaken over the past 20 years have consistently shown that electric energy used to generate light in commercial buildings can be reduced by 10%–30% by using a photosensor to reduce the level of electric-powered light when daylight is available, and to maintain the electric light levels at design levels throughout lamp life. Consumers perceive daylight dimming systems as ineffective, however, and are reluctant to install lighting control systems that dim or switch electrical lighting fixtures when daylight is present.

Illumination control is difficult because the sensor, for practical reasons, is usually located on the ceiling or high on a wall, while "useful" illumination is more closely associated with illumination of the task or work-plane (typically a desktop). Moreover, the ratio for the illumination level at the task location to the illumination level at the operational sensor location is different for solar light and electric light. This difference is due to multiple factors including room geometry and incident angles of the light source to the work surface.

A lighting control system employing a control algorithm that merely tries to maintain a constant sensor signal will not provide, in fact, adequate useful illumination as the distribution of light within the space changes to a higher composition of daylight. Task-to-ceiling illumination ratios typically vary by a factor of five or more when going from the conditions of 100% electric-powered lighting to 100% day light. Therefore, the sensor signal does not increase proportionally with the illumination of the task location. The typical outcome is that the electric-powered lights are dimmed too much in the presence of daylight. Occupants then complain of insufficient light and the control is disabled, or adjusted to allow very little dimming.

To overcome the problem of variable task-to-sensor light level ratios for solar and electric light, proportional control systems have been suggested. Proportional control systems require commissioning, however, which can be difficult and expensive thus limiting their effective use. Most products on the market do not offer sufficient adjustment capabilities (both in terms of adjustment mechanics and range of adjustment) to allow easy commissioning. Many photosensors must be moved to different locations using a trial-and-error approach to get satisfactory performance. Such movement is time consuming, aggravating, and expensive. For at least these reasons, commissioning is often not done completely or properly and the systems fail to work as intended.

The cost of installation and commissioning is another reason that consumers are reluctant to install lighting control systems to dim or switch electrical lighting fixtures when daylight is present. Current lighting control systems require the sensor, typically mounted on the ceiling, to be hard-wired between the lighting fixtures and their power source. Commissioning current photosensor lighting control systems typically requires the use of extraneous light meters and physical adjustment of the photosensor. Frequently commissioning must be performed during multiple daylight conditions, sometimes including measurements in the absence of daylight.

Another problem is that some users do not prefer the same level of illumination as the proposition of daylight to total available light changes. Preference studies have shown that, under some circumstances, people want higher levels of illumination as interior daylight levels increase.

An additional photosensor problem is that, when different sensors are used for commissioning measurements taken at different locations, they can have different sensitivity to infrared (IR) radiation. This difference affects system performance because daylight contains much more infrared radiation than fluorescent lighting for the same amount of visible light. Therefore, the photosensor dims the electric lighting when it is essentially sensing invisible IR radiation rather than visible light.

Significant effort has been directed to solving these problems as evidenced by patents and other references directed to proposed solutions. A summary of some of the more pertinent references follows.

U.S. Pat. No. 6,188,182 issued to Nickols et al. is directed to a power control apparatus with a digital processing mechanism which provides a signal for controlling power provided to electric lighting. The digital processing mechanism provides a first power level sufficient for lighting fixture start-up, and a second power level for reduced power consumption load corresponding to predetermined power levels for the particular time of day. The digital processing mechanism can provide (1) a second signal which is further responsive to a detected illumination level or a weighted average of detected illumination levels, as well as (2) manual inputs to change stored control parameters.

U.S. Pat. No. 5,701,058 issued to Roth is directed to a method of calibrating a dimmable lighting system. Illumination levels are measured under controlled indoor and outdoor lighting situations and a set point and gain are determined to maintain a constant lighting level at points of interest. A light sensor supplies a voltage signal to dimming electronics which calculate the amount of electric light needed using the set point and gain values.

An article by Rubenstein et al., "Improving the Performance of Photo-Electrically Controlled Lighting Systems," J. of Illuminating Eng'g Soc. (Winter 1989), is directed to various control algorithms for dimming electrical lighting fixtures in response to an illumination detection signal. Closed-loop proportional control algorithms were found to outperform other lighting control algorithms tested.

Despite these efforts, photosensors are rarely used in commercial lighting applications in the United States. Consequently, a need exists for a photosensor and lighting control system that will be widely utilized to reduce power consumption by electrical lighting fixtures.

SUMMARY OF THE INVENTION

To meet this and other needs, and in view of its purposes, the present invention provides a lighting control system and photosensor that can provide a desirable level of lighting at a task location while saving energy. The system decreases the amount of controlled (typically electric) light in response to the presence of both uncontrolled (typically solar) light and controlled light, the difference in the ratios of an illumination level at a task location to an illumination level at an operational sensor location for uncontrolled light and controlled light, and a user's lighting preference. In one embodiment of the present invention, the photosensor can self-commission to compensate for this difference in illumination ratios. As used in this document, "self-commissioning" means that the photosensor performs all measurements and all calculations required to determine the controlled light set-point and illumination level ratios for uncontrolled and controlled light in order to complete the commissioning procedure.

A responsive, closed-loop, proportional control algorithm is used in the present invention. The algorithm can allow for desktop illumination to increase slightly as uncontrolled (solar) light levels rise. The commissioning procedure is programmed into the photosensor to provide quick and easy commissioning. The photosensor performs the necessary measurements and calculations and prompts the operator to move the portion of the photosensor that senses illumination level.

The photosensor preferably includes a self-powered photocell unit having a photodiode and a wireless transmitter that transmits a wireless sensor signal responsive to the illumination level at the photocell unit. This arrangement allows the photocell unit to be easily moved for commissioning. In addition, all commissioning measurements can be taken using the same photodiode, reducing variability caused by differences in sensitivity to spectral differences between uncontrolled (solar) light and controlled (electric) light.

It is worth noting that a high-quality photosensor will enable "lumen maintenance" dimming in addition to daylight dimming. The maximum light output of all lamps will decrease as they age. To accommodate this fact, lighting systems are currently designed to produce more than the required amount of light when they are new, so that the lighting system meets the design goal near the end of lamp life. By using a photosensor to control power to the lighting system, the input power to the lighting system can be decreased when is the lamps are new and gradually increased as the lamps age, saving a great deal of energy over the life of the system.

Energy savings resulting from the use of lighting controls, such as photosensors, vary depending on the application. In private offices, the energy savings can reach as high as 60% because lights can be turned off when daylight is available. Open-plan offices typically have lights on, however, although lights near perimeter windows can be dimmed, so savings are not as great. Research shows that current energy savings attributed to the use of existing light controls is 18% and that current market penetration of existing products is 3.3% or less of commercial or industrial floorspace. Using the present invention, the expected energy savings could go up to 30% and the market penetration could double to 6.6%.

With the documented energy savings, conventional photosensors could be currently saving 17.7 million kWh in the State of Connecticut. Consider the prospective advantages of the present invention. The combination of a reduction in energy consumption by 30% on average with a doubling of market penetration would result in a 59.1 million kWh savings annually in Connecticut alone. Using standard United States Department of Energy (USDOE) calculation methodology, the energy savings described above will result in an annual reduction of 45 million metric tons of $CO_2$, 0.1 million metric tons of $SO_2$, and 0.055 million metric tons of $NO_x$ in Connecticut. These reductions would be of great benefit to the air quality in Connecticut.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawings are not to scale. On the contrary, the dimensions of the various features arbitrarily expanded or reduced for clarity. Included in the drawing are the following figures:

FIGS. 4A and 4B are schematic diagrams of a photocell unit according to one embodiment of the present invention;

FIGS. 6A and 6B are schematic diagrams of an interface control unit according to one embodiment of the present invention;

DETAILED DESCRIPTION OF THE INVENTION

Figure 1:
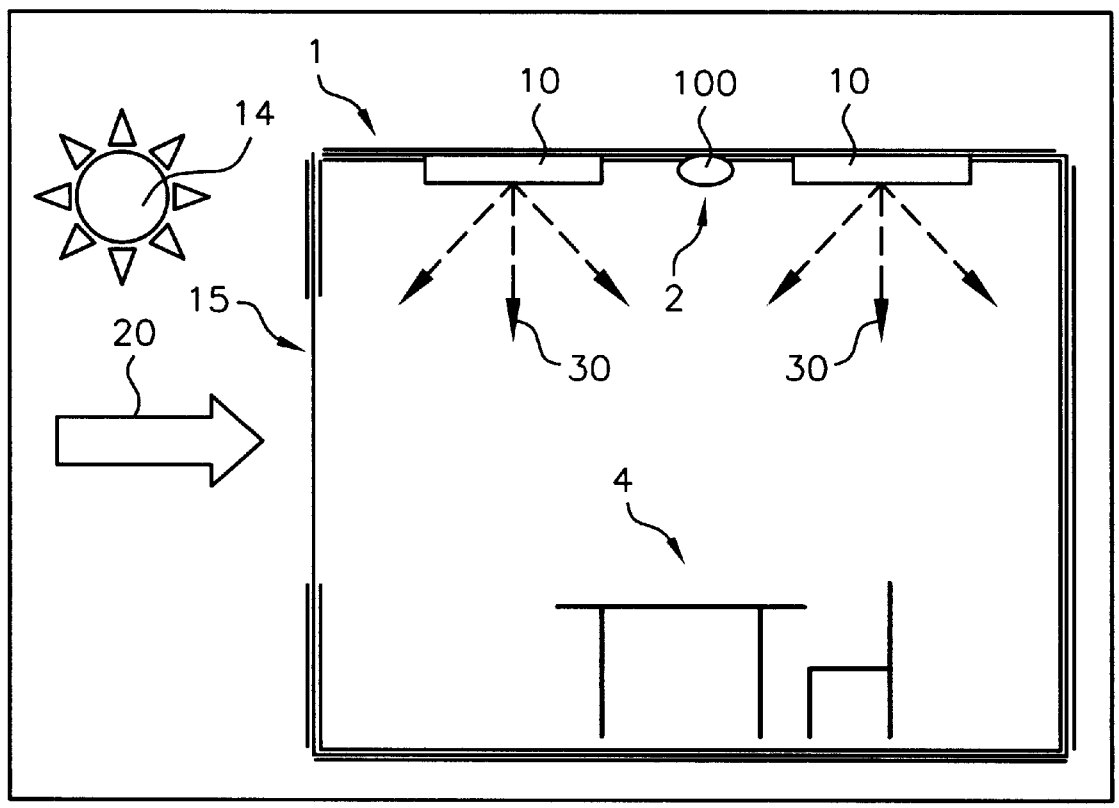
FIG. 1 is a diagram of a windowed office or work space that can benefit from the present invention.

Referring now to the drawing, in which like reference numbers refer to like elements throughout, FIG. 1 shows a typical work space 1. Typical work space 1 has windows 15 which allow solar light 20 from the sun 14 and reflected solar light from the sky and ground to enter the work space 1. This solar light 20 could be used to replace some or all of the electric light 30 provided by one or more electrical lighting fixtures 10 to provide illumination of a task location 4 in the work space 1. To control the amount of illumination provided by lighting fixtures 10, a photosensor 100 is incorporated in a lighting control system to dim or switch off the lighting fixtures 10 in response to the illumination available in the work space 1. The most convenient location for the photosensor 100 is at an operational sensor location 2, typically on the ceiling or is high on a wall of the work space 1.

Figure 2:
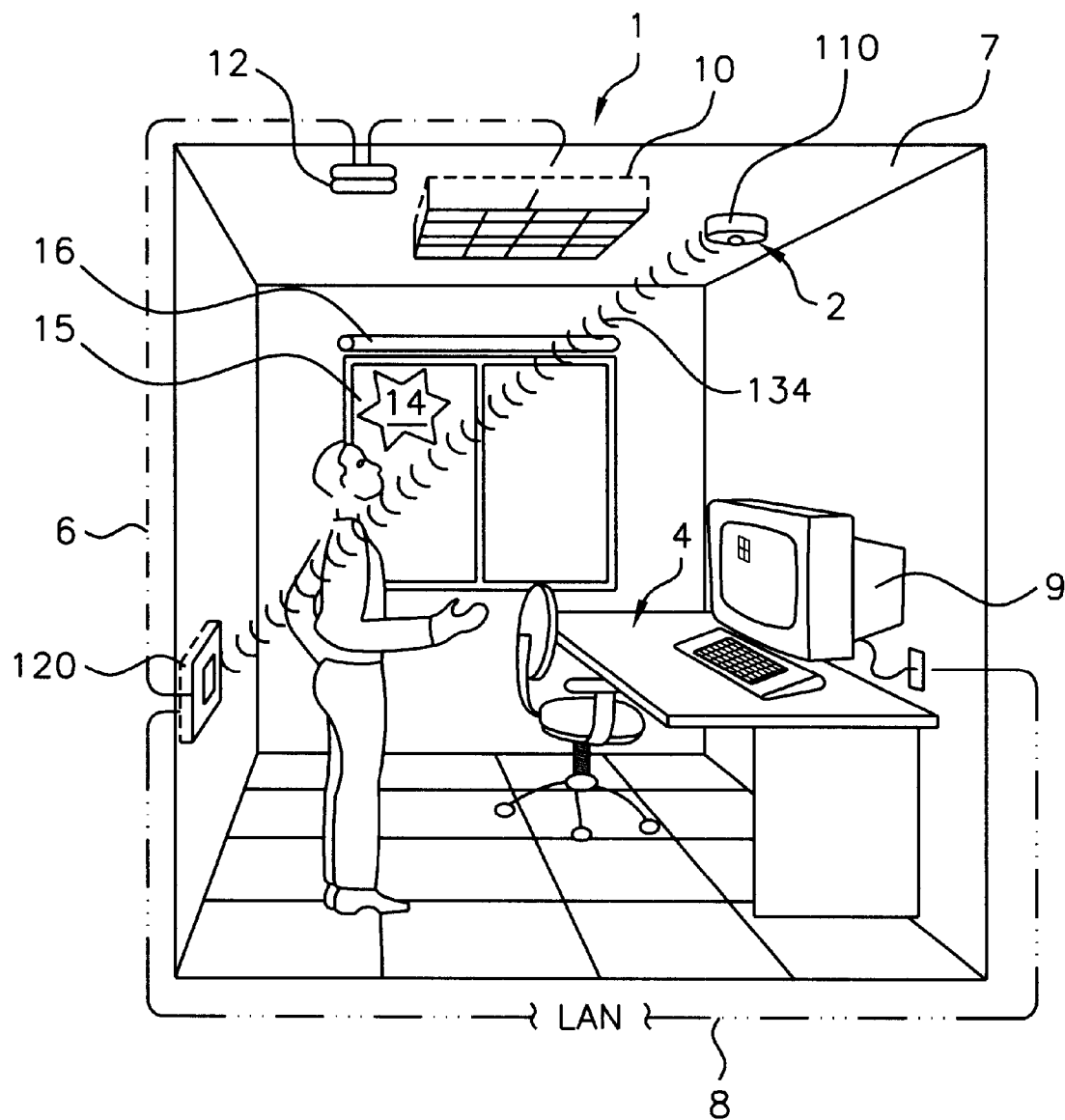
FIG. 2 is a diagram showing a lighting control system using a photosensor according to one embodiment of the present invention.

In one embodiment of the present invention, as shown in FIG. 2, the photosensor 100 includes two separate units: a photocell unit 110 and an interface control unit 120. Photocell unit 110 generates a wireless sensor signal 134 responsive to the illumination level at photocell unit 110. Photocell unit 110 is movably mounted in an operational sensor location 2. Operational sensor location 2 can be on the ceiling 7 as shown in FIG. 2 or in another convenient location within work space 1. Photocell unit 110 preferably includes a photodiode, a wireless transmitter, and an internal power source enabling it to transmit a wireless sensor signal 134 responsive to the illumination level at the photocell unit 110 and to be freely moved between task location 4 and operational sensor location 2 for commissioning.

Figure 6B:
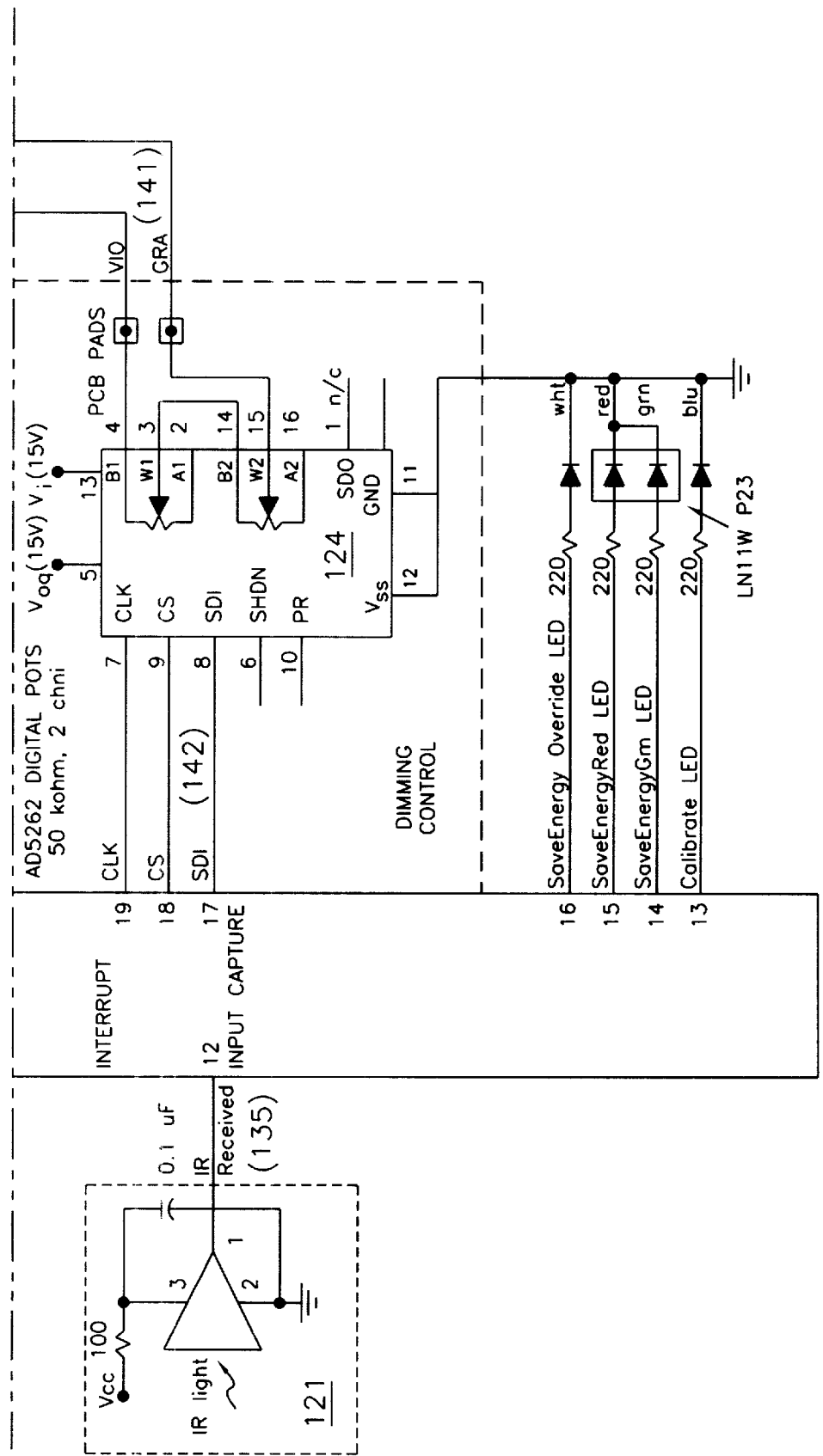

Interface control unit 120 is hard-wired to AC power line 6 and to lighting fixture 10, preferably at a dimming control ballast 12 which is part of lighting fixture 10. Interface control unit 120 receives wireless sensor signal 134, performs an illumination algorithm, and provides a control signal 141 (see FIG. 6) to lighting fixture 10, preferably to control ballast 12. Control signal 141 can be provided over AC power line 6, for example, by using a phase control method to vary the power to lighting fixture 10. Alternatively, control signal 141 can be provided on wiring separate from AC power line 6 as shown in FIG. 6.

Control signal 141 is responsive to wireless sensor signal 134 and, therefore, to the illumination level at photocell unit 110. Control signal 141 is also responsive to the illumination algorithm. The illumination algorithm is commissioned to provide an output that is responsive to (1) the difference in ratios of the illumination level at task location 4 to the illumination level at sensor location 2 for solar light and electric light, and (2) the minimum desired illumination level at task location 4.

Control ballast 12 alters the power supplied to lighting fixture 10, to adjust the intensity of electric light provided by lighting fixture 10. Control ballast 12 is responsive to control signal 141. It should be understood that lighting fixture 10 may include multiple lighting fixtures.

Still referring to FIG. 2, the interface control unit 120 may be wired to a computer 9 through a local area network (LAN) line 8. Connection to computer 9 will allow an operator to both input and extract information directly to and from photosensor 100. For example, the set-point can be modified for "lumen maintenance" dimming in addition to daylight dimming to provide added energy savings while maintaining an acceptable illumination level at task location 4.

Figure 3:
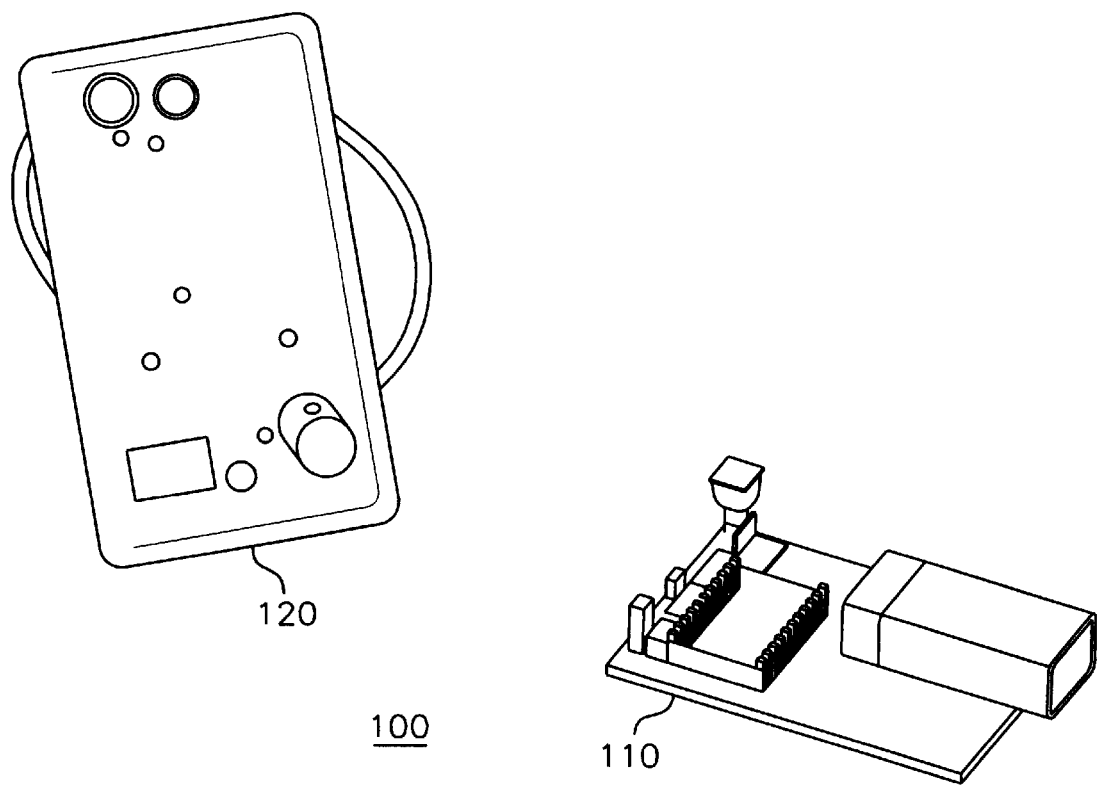
FIG. 3 shows an interface control unit and a photocell unit according to one embodiment of the present invention.

FIG. 3 shows one embodiment of the photosensor 100 including photocell unit 110 and interface control unit 120. Interface control unit 120 is preferably configured to fit in place of standard wall switch. As is well known in the art, a standard wall switch can be an on-off switch or a dimming switch for lighting control or an AC outlet configured to fit in a standard-sized wall switch enclosure.

Figure 4B:
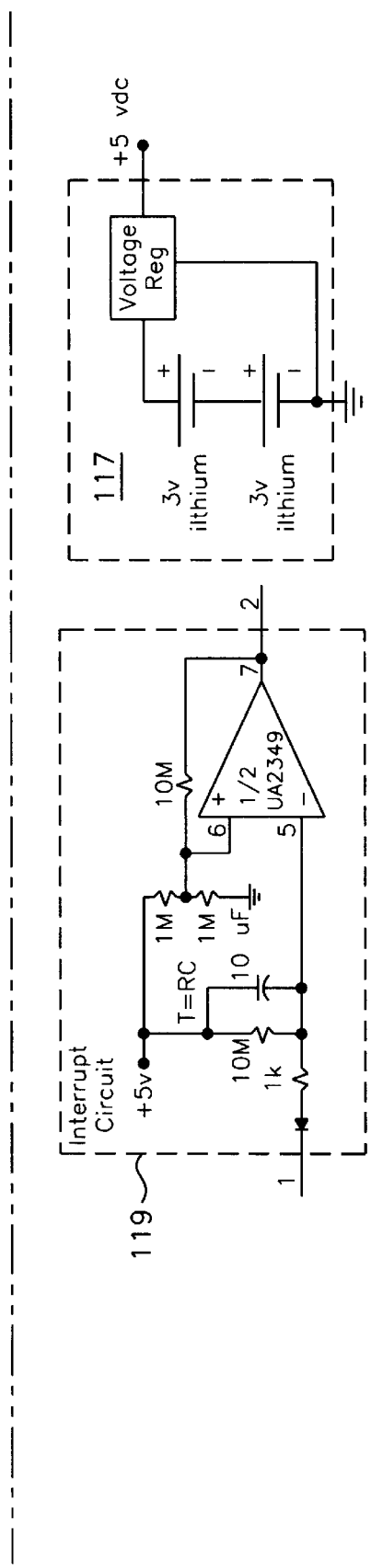

Referring to FIG. 4, a photodiode 111 in the photocell unit 110 generates a sensor signal 131 in response to sensed light 40. When electrical lighting fixture 10 is on during daylight conditions, the sensed light 40 is the sum of the illuminations from solar light 20 and electric light 30. Sensor signal 131 can be, for example, an analog current signal. Sensor signal 131 is amplified by an amplifier 112 resulting in an amplified sensor signal 132. An analog-to-digital converter (ADC) 114 converts amplified sensor signal 132 to a digital sensor signal 133 which may have addressing incorporated to prevent cross-talk where multiple photocell units 110 are used in close proximity. Digital sensor signal 133 is transmitted by a wireless transmitter 115 as wireless sensor signal 134. As shown in FIG. 4, wireless transmitter 115 can be an IR light emitting diode (LED) in series with a switching transistor. Other types of wireless transmitters are also contemplated, however, including, but not limited to, an RF transmitter.

The gain of amplifier 112 can be controlled by an auto-ranging circuit in which ADC 114 switches various complementary metal-oxide-semiconductor (CMOS) gates into the auto-ranging circuit depending on the amplitude of amplified sensor signal 132. The various CMOS gates (which can be located, for example, on a CMOS switch 113) are connected at their outputs to a series of resistors 116 having graduated resistance values such that the selected resistor adjusts the gain of amplifier 112 to accommodate one of a group of ranges which are, for example, graduated in multiples of ten.

Photocell unit 110 includes an internal power supply 117, which may comprise one or more batteries and a voltage regulator. Internal power supply 117 provides DC power to ADC 114, CMOS switch 113, amplifier 112, and wireless transmitter 115. Internal power supply 117 and wireless transmitter 115 allow photocell unit 110 to operate without being hard-wired. By eliminating the need to hard-wire the photocell unit 110 mounted on the ceiling 7 or high on the wall for convenience, installation cost is reduced. More significantly, the self-powered, wireless photocell unit 110 can be easily moved between task location 4 and operational sensor location 2 and operate at both locations for commissioning, thereby allowing photosensor 100 to self-commission.

Because the illumination levels from electric light 30 and solar light 20 are different at task location 4 and operational sensor location 2, the photosensor 100 cannot be set to adjust the intensity of light supplied by lighting fixture 10 to the illumination level desired at task location 4. Furthermore, the ratio of illumination at task location 4 to illumination at operational sensor location 2 is different for electric light 30 and solar light 20. Therefore, the photosensor 100 must be commissioned to adjust the intensity of light supplied by lighting fixture 10 proportionally to the sensed light 40 and to begin reducing the intensity of light supplied by lighting fixture 10 (i.e., dimming) at a sensed illumination level at which adequate illumination is provided at task location 4 (i.e., set-point).

In current photosensor-controlled lighting systems, commissioning is performed by measuring illumination levels at both a task location and a sensor location with a light meter at two separate times with different levels of solar light (e.g., daylight and night). The set-point and ratio are calculated, and the photosensor is set and installed. In the present invention, the commissioning procedure is programmed into photosensor 100. Photosensor 100 controls the electrical lighting fixture 10 and can, therefore, measure illumination levels with and without electric light 30, calculating the illumination from electric light 30 by subtraction.

Figure 7:
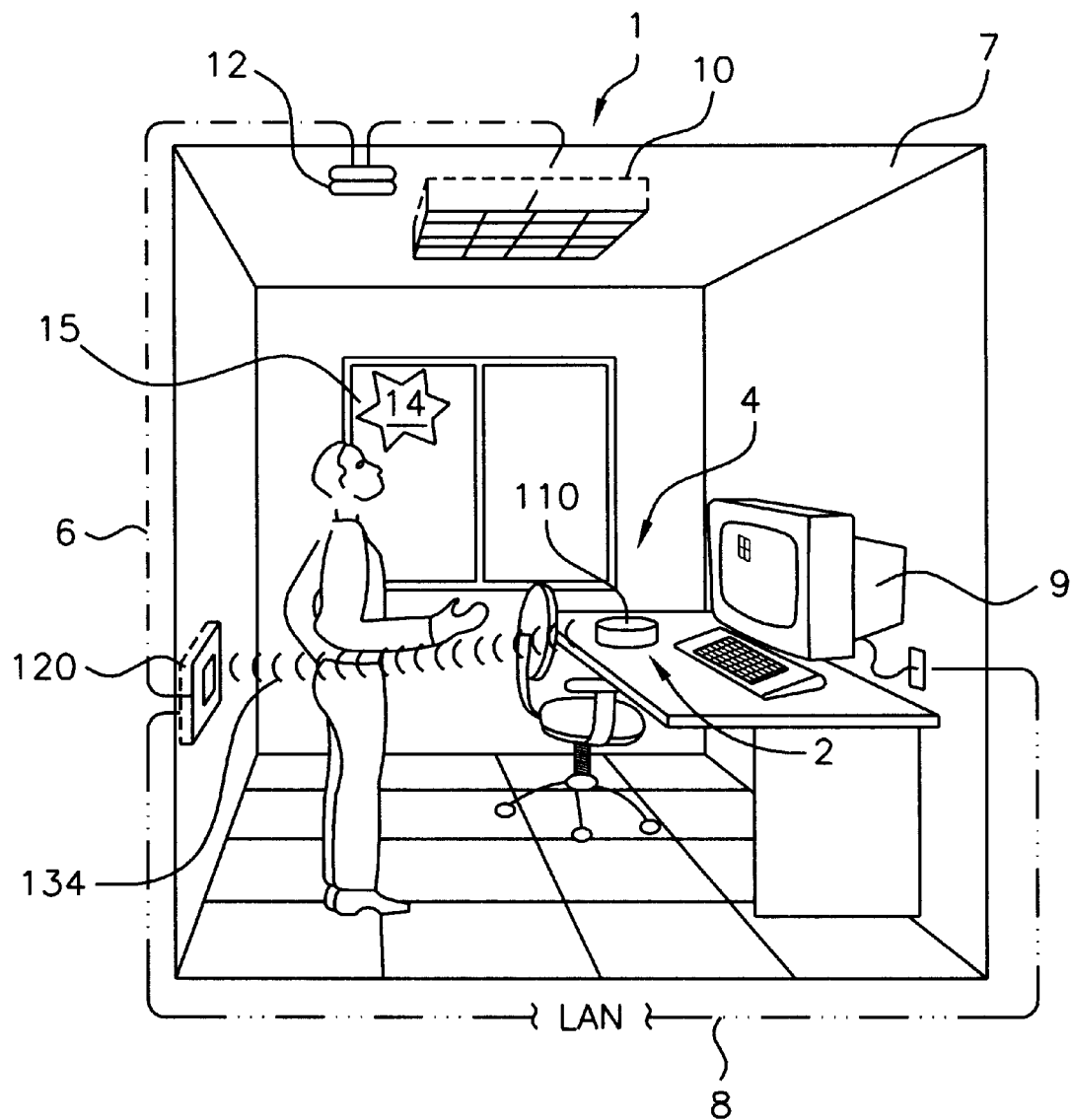
FIG. 7 is a diagram showing a lighting control system according to one embodiment of the present invention with a photocell unit positioned at a task location during a first portion of an automatic commissioning procedure.

In one embodiment of the present invention, a commissioning button 118 is provided for operator input during the commissioning, and a commissioning procedure is programmed into photosensor 100. The commissioning button 118 is preferably located on photocell unit 110, but other locations are possible. To commission photosensor 100, an operator initiates the programmed commissioning procedure by positioning photocell unit 110 at task location 4, as shown in FIG. 7, and pressing commissioning button 118. Photosensor 100 then automatically measures the combined solar light 20 and electric light 30 illumination level at task location 4, turns off the electrical lighting fixture 10, measures a solar light 20 illumination level at task location 4, turns on the electrical lighting fixture 10, and prompts an operator to move photocell unit 110. The operator positions photocell unit 110 at operational sensor location 2, as shown in FIG. 2, and again presses commissioning button 118. Photosensor 100 then automatically measures a combined solar light 20 and electric light 30 illumination level at operational sensor location 2, turns off electrical lighting fixture 10, measures a solar light 20 illumination level at operational sensor location 2, turns on electrical lighting fixture 10, and calculates set-point and ratios for use by an illumination control algorithm to compensate for differences in task-to-sensor illumination ratios between solar and electric light.

Still referring to FIG. 4, photocell unit 110 may further include an interrupt circuit 119 to prevent power from being drawn from internal power supply 117 between transmissions of wireless sensor signal 134. ADC 114 is in essence "put to sleep" for a short period of time. Transmissions of the wireless sensor signal 134 can be set to occur at a predetermined interval or can be adjustable after installation. Optional interrupt circuit 119 would prolong the life of any batteries used in internal power supply 117.

Figure 5:
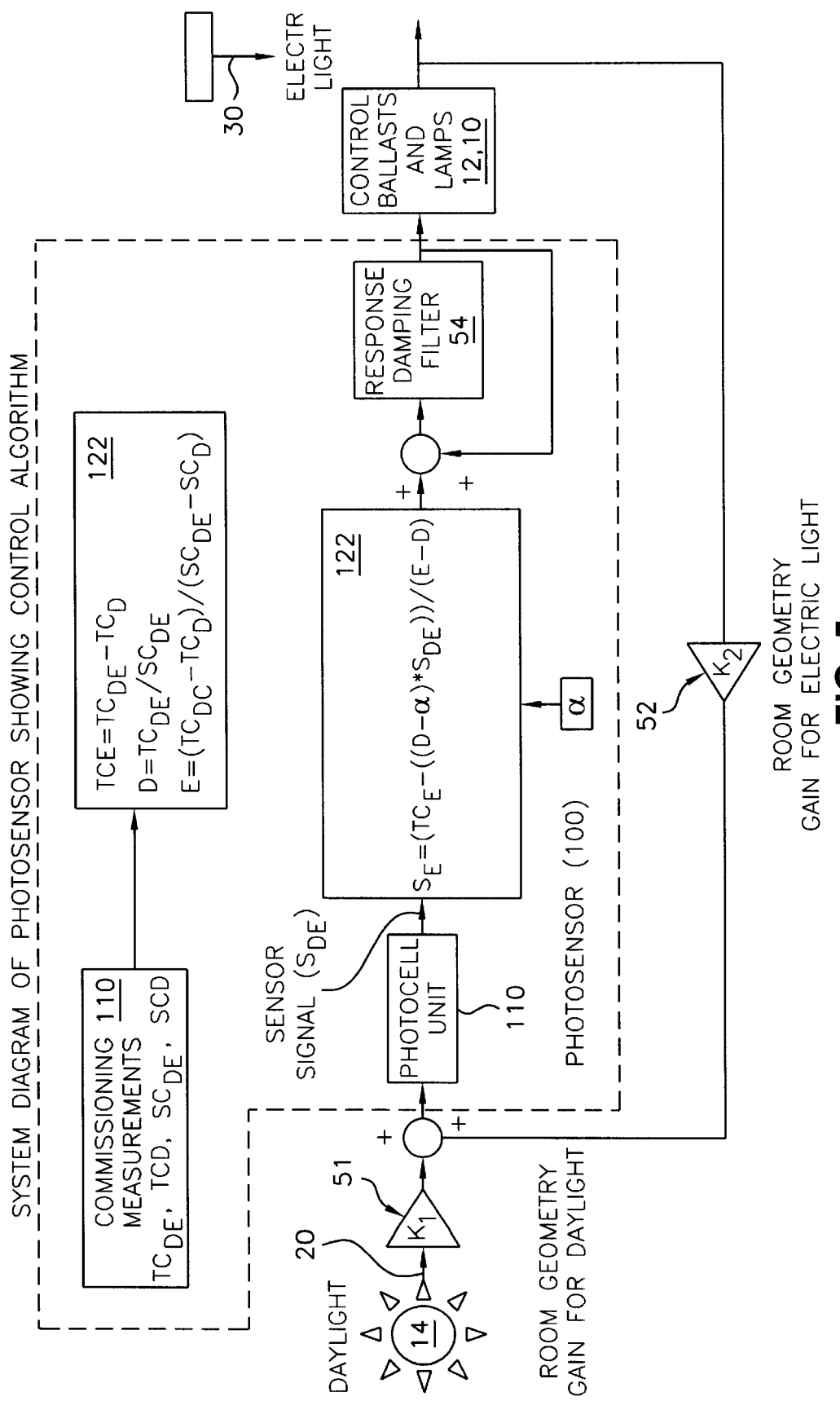
FIG. 5 is a system diagram of a lighting control system according to one embodiment of the present invention.

Referring to FIG. 5, solar light 20 and electric light 30 have different gain characteristics 51 ($K_1$), 52 ($K_2$) between task location 4 and photocell or sensor location 2. Sensed light 40 detected by photocell unit 110 is a combination or sum of solar light 20 and electric light 30, and cannot be used by itself to adjust light intensity of lighting fixture 10. Commissioning must be performed to compensate for these different gain characteristics.

As shown in FIG. 5, four measured commissioning illumination level values are stored in the processing unit 122: illumination level for solar light 20 and electric light 30 at task location 4 ($TC_{DE}$), illumination level for solar light 20 only at task location 4 ($TC_D$), illumination level for solar light 20 and electric light 30 at operational sensor location 2 ($SC_{DE}$), and illumination level for solar light 20 only at operational sensor location 2 ($SC_D$). These values are used to calculate the set-point and daylight and electric light ratios.

$$\text{Set-point } (TC_E) = TC_{DE} - TC_D \quad \text{(eq.1)}$$

The set-point is defined as the illumination level at task location 4 due to electrical lighting during commissioning with no dimming. The set point is equal to the difference between the measured illumination levels for combined solar light 20 and electric light 30 at task location 4 and the measured illumination level for solar light 20 only at task location 4.

$$\text{Ratio for solar light } (D) = TC_D / SC_D \quad \text{(eq.2)}$$

The task-to-sensor illumination ratio for solar light 20 is equal to the quotient of the measured illumination level for solar light 20 at task location 4 divided by the measured illumination level for solar light 20 at operational sensor location 2.

$$\text{Ratio for electrical light } (E) = (TC_{DE} - TC_D)/(SC_{DE} - SC_D) \quad \text{(eq.3)}$$

The task-to-sensor illumination ratio for electric light 30 is equal to the quotient of the difference between the measured illumination level for combined solar light 20 and electric light 30 and the measured illumination level for solar light 20 only at task location 4 (illumination level for electric light 30 at task location 4) divided by the difference between the measured illumination level for combined solar light 20 and electric light 30 and the measured illumination level for solar light 20 only at operational sensor location 2 (illumination level for electric light 30 at operational sensor location 2).

The set-point ($TC_E$) and ratios (D & E) are provided to the illumination algorithm together with the actual illumination level at operational sensor location 2 ($S_{DE}$) (i.e., received sensor signal 135 as shown in FIG. 6) and a user preference input α to calculate the target illumination level at operational sensor location 2 for electric light 30 (i.e., $S_E$) which is provided as control signal 141.

$$S_E = (TC_E - ((D - \alpha) * S_{DE}))/(E - D) \quad \text{(eq.4)}$$

User preference input α can be one of a series of incremental factors between 0 and 1, selected by pressing on the save energy button 123 (see FIG. 6) a number of times corresponding to the desired factor. This factor will increase the intensity of light from electrical lighting fixture 10. User preference input α can be used to compensate for the common preference for increased illumination when solar light 20 is present, while still providing some energy savings. It should be understood that user preference input α is preferably independent of the commissioning procedure.

Photosensor 100 may include a response damping filter 54 as shown in FIG. 5. Response damping filter 54 prevents photosensor 100 from decreasing the intensity of electrical light fixture 10 too much, thereby preventing oscillations of the illumination level at task location 4. In addition to helping stabilize the illumination level, response damping filter 54 prevents sudden electric light level changes that can annoy occupants.

Referring to FIG. 6, interface control unit 120 is hard-wired to AC power line 6 and to lighting fixture 10, preferably at control (dimming) ballast 12. A receiver 121 receives wireless sensor signal 134 and provides received sensor signal 135 to processing unit 122. Processing unit 122 performs the lighting control algorithm using received sensor signal 135 and set-point $TC_E$ and ratios (E & D) and user preference input (∀) described above. A digital control signal 142 is provided by the processing unit 122.

In one embodiment, a digital potentiometer 124 converts digital control signal 142 into an analog voltage signal and provides control signal 141 to control (dimming) ballast 12. It should be understood that the form of control signal 141 depends upon the type of ballast used in lighting fixture 10. The various methods for using, and if necessary converting, the target illumination level at operational sensor location 2 ($S_E$) to control the intensity of electric light 30 will be apparent to those having skill in the art, and are not a part of the present invention.

As shown in FIG. 6, a switching relay 125 can be included in interface control unit 120. Switching relay 125 can be used to switch off AC power to the electrical lighting fixture 10 by the processing unit 122, such as during commissioning. Switching relay 125 can also be used to switch off AC power to the electrical lighting fixture 10 from a wall switch 126, such as when the work space 1 will be unoccupied. Interface control unit 120 can further include one or more power supplies 127 as necessary to power the various components of interface control unit 120 and status LEDs to provide a visual indication of the level of energy saving presently achieved, as well as whether commissioning is taking place and at which step.

It should be noted that the present invention preferably includes the capability to manually override dimming provided by the lighting control system. For example, normal operation of the system could be overridden by pressing save energy button 123 for more than two seconds. This action would cause the interface control unit 120 to provide a control signal corresponding to the maximum intensity of lighting fixture 10.

In the present invention, the photosensor 100 can be programmed to perform commissioning (i.e., the photosensor 100 can self-commission). A program code comprising logic can be programmed into processing unit 122 which is preferably a microprocessor having programmable logic circuitry and memory. The program code can be stored on a machine-readable medium such as those known in the art or those yet to be developed. When the program code is executed by a machine (i.e., the processing unit 122), the machine implements a method for commissioning the photosensor 100 for use in a lighting control system. The steps of the commissioning procedure code are provided in the following table.

| Step number | Step description |
| --- | --- |
| 1 | Measure illumination level. |
| 2 | Record measurement as $TC_{DE}$. |
| 3 | Turn off electrical lighting fixture. |
| 4 | Measure illumination level. |
| 5 | Record measurement as $TC_D$. |
| 6 | Turn on electrical lighting fixture. |
| 7 | Prompt operator to move photocell unit. |
| 8 | Measure illumination level. |
| 9 | Record measurement as $SC_{DE}$. |
| 10 | Turn off electrical lighting fixture. |
| 11 | Measure illumination level. |
| 12 | Record measurement as $SC_D$. |
| 13 | Turn on electrical lighting fixture. |
| 14 | Calculate set-point $TC_E$ (eq. 1). |
| 15 | Calculate solar light ratio D (eq. 2). |
| 16 | Calculate electric light ratio E (eq. 3). |

Figure 8:
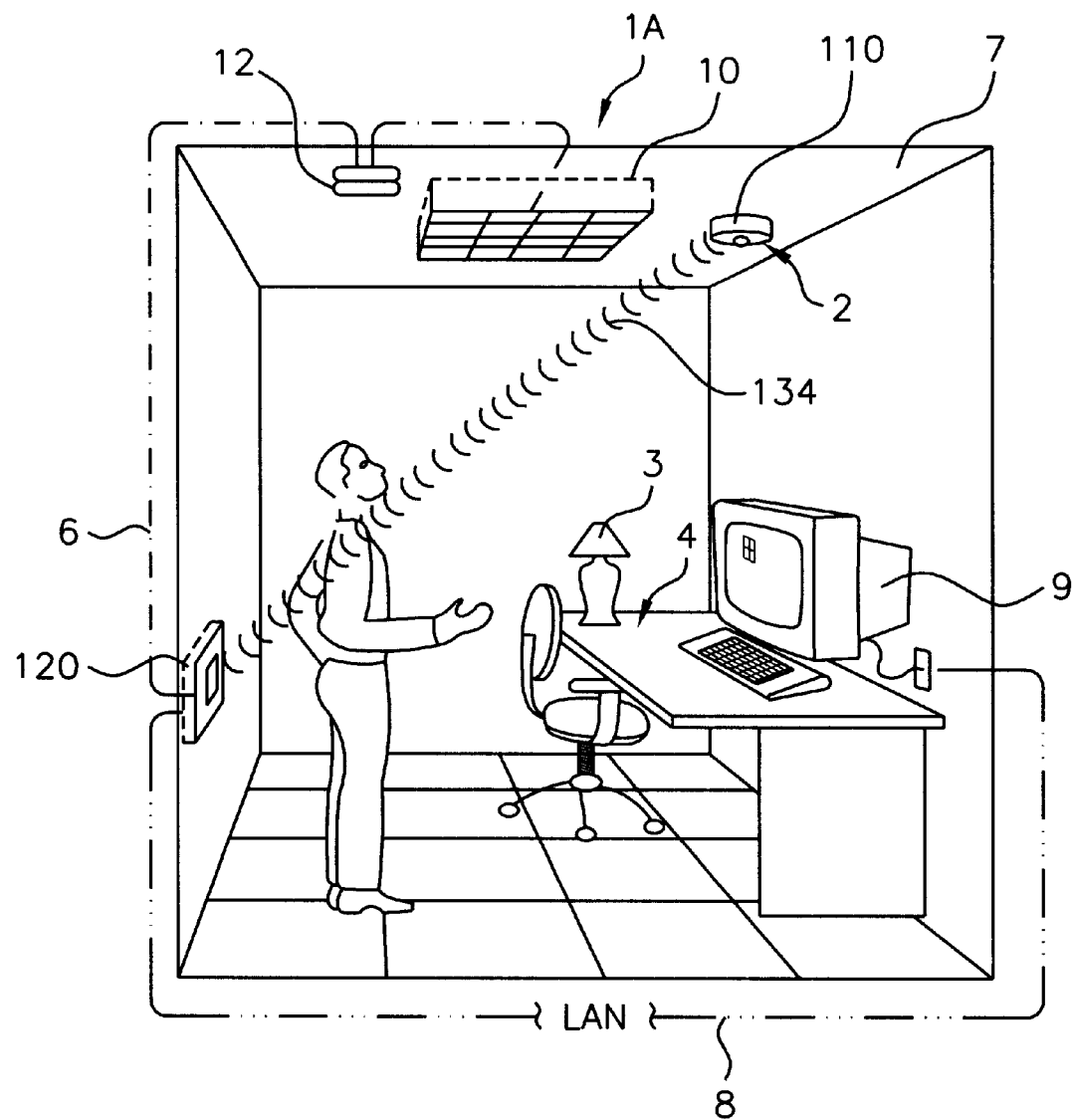
FIG. 8 is a diagram showing the lighting control system according to the present invention as applied in a windowless office or work space.

Several modifications might be made, to the embodiment of the lighting control system according to the present invention described above, one of which is illustrated in FIG. 8. Such modifications would accommodate a work space 1a without access to solar light 20 (e.g., an office without windows 15). Such a work space 1a might be illuminated by two, separate sources of artificial (i.e., non-solar) light. One source of light would be controlled (as described above) by the lighting control system according to the present invention; the other source of light would be uncontrolled (and, therefore, would correspond to the solar light 20 in the embodiment described above). A typical example of the uncontrolled source of light is a desk lamp 3. Another example is building lighting that is not controlled by the lighting control system. The principles of the present invention described above apply to accommodate work space 1a.

Another optional enhancement to the lighting control system of the present invention accommodates especially sunny days. In some work spaces 1 having windows 15, especially on days of bright sunlight, the solar light 20 more than amply provides the maximum illumination desired at task location 4. In fact, it is too bright at task location 4. In this case, of course, the control signal 141 provided to control (dimming) ballast 12 will essentially turn off lighting fixture 10. Despite the absence of electric light 30, the extreme solar light 20 may cause the sensed light 40 to exceed desired limits.

An optional enhancement can solve this problem. The lighting control system of the present invention simply incorporates another component, such as window shade 16 as illustrated in FIG. 2. If the illumination of task location 4 remains too high even after lighting fixture 10 is turned off, then the system sends a control signal to activate shade 16, causing shade 16 to partially cover window 15 and block some of the solar light 20 entering window 15. This automatic action will reduce the illumination at task location 4. A feedback loop can be established, including the steps of lowering shade 16 and sensing the illumination at task location 4, until an acceptable level of illumination is achieved. Thus, further advantages are possible upon combining control of both lighting fixture 10 and (for example) shade 16 using the lighting control system of the present invention.

The interaction of shade 16 (which affects solar light 20) and lighting fixture 10 (which provides electric light 30) works in reverse as the amount of solar light 20 decreases from its overly bright amount. The lighting control system gradually removes shade 16 from covering window 15 to allow more and more solar light 20 to shine on task location 4, assuring that desired levels of illumination are maintained at task location 4. Eventually, shade 16 will be completely removed. The lighting control system then begins to activate lighting fixture 10, thereby supplementing solar light 20 with electric light 30, to meet illumination requirements at task location 4.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A lighting control system for providing a desirable illumination level at a task location illuminated by controlled electric light while saving power, the system comprising:

at least one lighting fixture producing the controlled electric light having an intensity responsive to a control signal provided to the lighting fixture; and a photosensor configured to provide the control signal to the lighting fixture responsive to an illumination level at an operational sensor location and ratios of illumination levels at the sensor location to task location for uncontrolled light and the controlled electric light, wherein the photosensor can self-commission.

2. The system of claim 1 wherein the photosensor includes a self-powered, wireless photocell that can be movably positioned at the task location and at the sensor location for commissioning measurements.

3. The system of claim 2 wherein the photocell transmits a wireless sensor signal proportional to the illumination level at the location of the photocell.

4. The system of claim 2 wherein the photocell includes a photodiode that generates an sensor signal responsive to an illumination level at the photocell and an amplifier with an auto-ranging circuit for adjusting the range of the sensor signal from the photodiode.

5. The system of claim 1 wherein the lighting fixture includes a control ballast for dimming and brightening the lighting fixture.

6. A lighting control system for providing desirable illumination at a task location while saving power, the system comprising:

at least one lighting fixture having a control ballast and producing controlled electric light with an intensity responsive to a control signal provided to the control ballast; and a photosensor which generates the control signal, the photosensor including:

a self-powered wireless photocell unit having a photocell for generating a sensor signal responsive to the illumination level and a wireless to transmitter for transmitting the sensor signal, and an interface control unit wired to AC power and the lighting fixture and adapted for receiving the sensor signal and providing the control signal to the lighting fixture;

wherein the control signal is responsive to illumination measured by the photocell, differences in the ratios of illumination at the task location to an operational sensor location for uncontrolled light and controlled electric light, and a user preference.

7. The system of claim 6 wherein the sensor signal is transmitted as an RF transmission.

8. The system of claim 6 wherein the sensor signal is transmitted as an IR transmission.

9. The system of claim 6 wherein the photosensor further includes a microprocessor programmed to generate the control signal responsive to measured sensor signal values for uncontrolled light and for combined uncontrolled light and controlled electric light taken with the photocell unit positioned at each of the task location and the operational sensor location.

10. The system of claim 9 wherein the microprocessor is further programmed to commission the photosensor using sensor signal values in the presence of uncontrolled illumination with the photocell unit positioned at the task location and at the operational sensor location with and without controlled electric lighting at each position.

11. The system of claim 10 wherein an operator is prompted to position the photocell unit at each location and provide a continuation input.

12. The system of claim 10 wherein the user preference is independent of the commissioning circuit.

13. The system of claim 6 wherein the interface control unit is configured for installation in place of a standard lighting switch.

14. The system of claim 6 wherein the photocell unit is configured to be movable between the task location and the operational sensor location for use in commissioning.

15. The system of claim 6 wherein the photocell unit includes an auto-ranging feature for the sensor signal.

16. A photosensor for use in a lighting control system including a self-powered wireless photocell unit configured to be movably positioned for commissioning the photosensor for differences in task-to-sensor illumination between uncontrolled light and controlled electric light.

17. The photosensor of claim 16 further comprising an interface control unit wired to AC power and to a lighting fixture producing the controlled electric light and adapted for receiving a sensor signal from the photocell unit and providing a control signal to the lighting fixture, wherein the control signal varies in response to the sensor signal and the illumination output of the lighting fixture is responsive to the control signal.

18. The photosensor of claim 17 wherein the photosensor commissioning procedure includes providing prompts for an operator to move the photocell unit.

19. The photosensor of claim 17 wherein the control signal can be incrementally modified by a manual input.

20. The photosensor of claim 17 wherein the control signal can be overridden by a manual input.

21. A method for commissioning a photosensor for use in a lighting control system comprising the steps of:
(a) providing a photosensor including a self-powered wireless photocell unit configured to be movably positioned for commissioning and a digital processing unit;
(b) positioning the photocell unit at a task location;
(c) initiating a commissioning procedure programmed in the processing unit, wherein the photosensor measures a combined uncontrolled light and controlled electric light illumination level at the task location, turns off an electrical lighting fixture providing the controlled electric light, measures an uncontrolled light illumination level at the task location, turns on the electrical lighting fixture, and prompts an operator to move the photocell unit;
(d) positioning the photocell unit at an operational sensor location; and
(e) continuing the commissioning procedure, wherein the photosensor measures a combined uncontrolled light and controlled electric light illumination level at the operational sensor location, turns off the electrical lighting fixture, measures the uncontrolled light illumination level at the operational sensor location, turns on the electrical lighting fixture, and calculates set-points for an illumination control algorithm using the measured illumination levels.

22. A method for commissioning a photosensor for use in a lighting control system, the method comprising the steps of:
(a) measuring a combined uncontrolled light and controlled electric light illumination level at a task location;
(b) turning off an electrical lighting fixture providing the controlled electric light;
(c) measuring an uncontrolled light illumination level at the task location;
(d) turning on the electrical lighting fixture;
(e) prompting an operator to move a photocell unit;
(f) measuring a combined uncontrolled light and controlled electric light illumination level at an operational sensor location;
(g) turning off the electrical lighting fixture;
(h) measuring an uncontrolled light illumination level at the operational sensor location;
(i) turning on the electrical lighting fixture; and
(j) calculating a set-point and ratios for an illumination control algorithm using the measured illumination levels.

23. The method of claim 22 wherein the set-point and ratios are calculated by a microprocessor.

24. A machine-readable medium having encoded on the medium a program code, wherein, when the program code is executed by a machine, the machine implements a method for commissioning a photosensor for use in a lighting control system, the method comprising the steps of:
(a) measuring a combined uncontrolled light and controlled electric light illumination level at a task location;
(b) turning off an electrical lighting fixture providing the controlled electric light;
(c) measuring an uncontrolled light illumination level at the task location;
(d) turning on the electrical lighting fixture;
(e) prompting an operator to move a photocell unit;
(f) measuring a combined uncontrolled light and controlled electric light illumination level at an operational sensor location;
(g) turning off the electrical lighting fixture;
(h) measuring an uncontrolled light illumination level at the operational sensor location;
(i) turning on the electrical lighting fixture; and
(j) calculating a set-point and ratios for an illumination control algorithm using the measured illumination levels.

* * * * *